United States Patent [19]

Varner

[11] 4,367,946
[45] Jan. 11, 1983

[54] LIGHT VALVE IMAGING APPARATUS HAVING IMPROVED OPTICAL CONFIGURATION

[75] Inventor: Jerry R. Varner, Fairport, N.Y.

[73] Assignee: Eastman Kodak Company, Rochester, N.Y.

[21] Appl. No.: 230,089

[22] Filed: Jan. 29, 1981

[51] Int. Cl.³ .............................................. G03B 27/72
[52] U.S. Cl. .................................. 355/71; 346/107 R; 355/1; 355/37; 358/75
[58] Field of Search ........................ 355/35, 71, 77, 54, 355/46, 70, 1, 67, 37; 358/75; 346/108, 109, 1.1, 107 R

[56] References Cited

U.S. PATENT DOCUMENTS 3,702,930 11/1972 Joel ................................... 355/67 X
4,312,004 1/1982 Samek et al. .................... 346/108 X Primary Examiner—Richard A. Wintercorn
Attorney, Agent, or Firm—John D. Husser

[57] ABSTRACT

Electronic imaging apparatus of the kind having an imaging zone; a light valve array comprising a plurality of discretely-addressable light-modulating pixel regions; illuminating means for directing light to the imaging zone via the array and means for addressing the pixels in accordance with image information, features light control means located between the illuminating means and such array for collimating illuminating light in a direction substantially normal to the ingress surface of the array.

6 Claims, 6 Drawing Figures

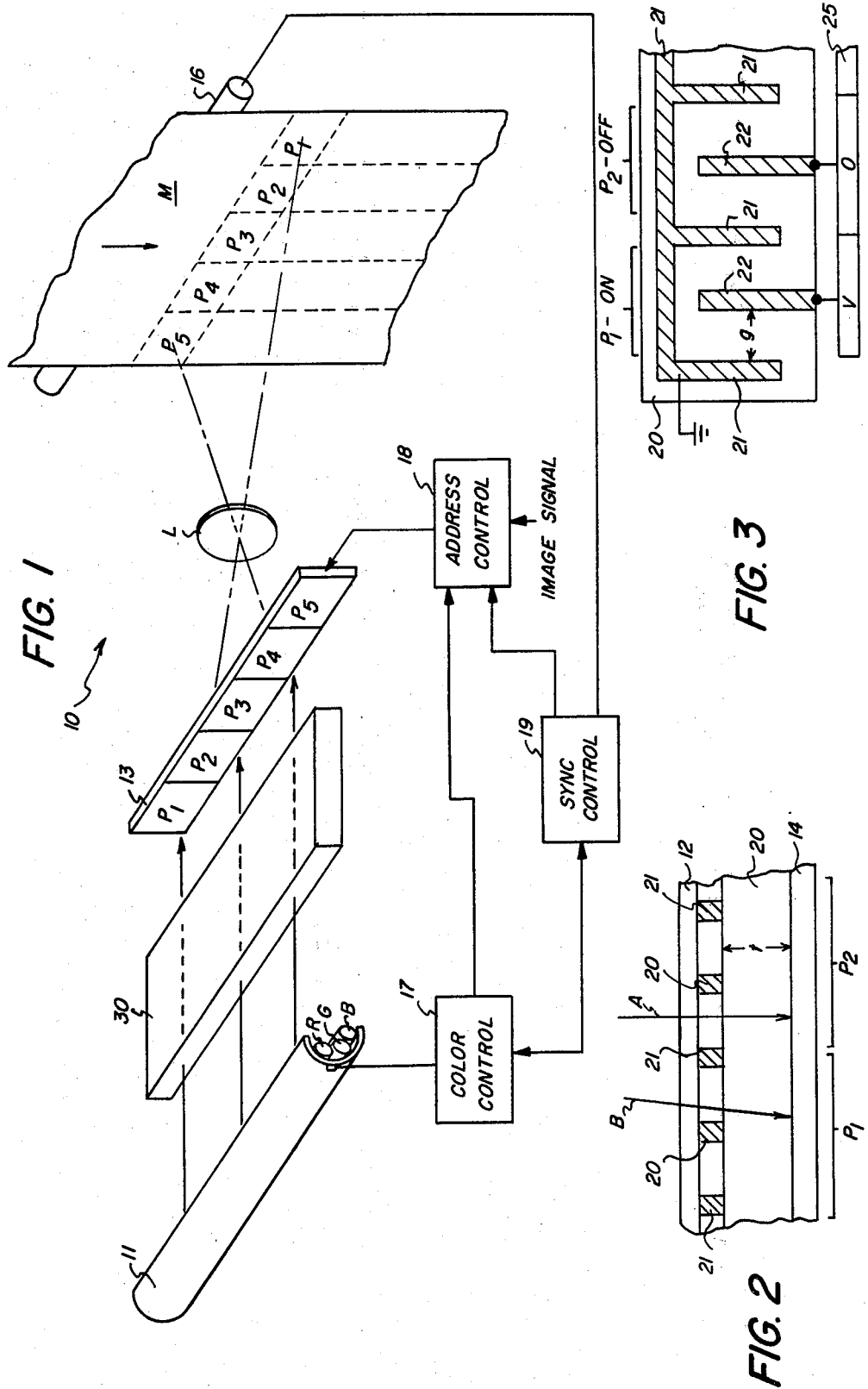

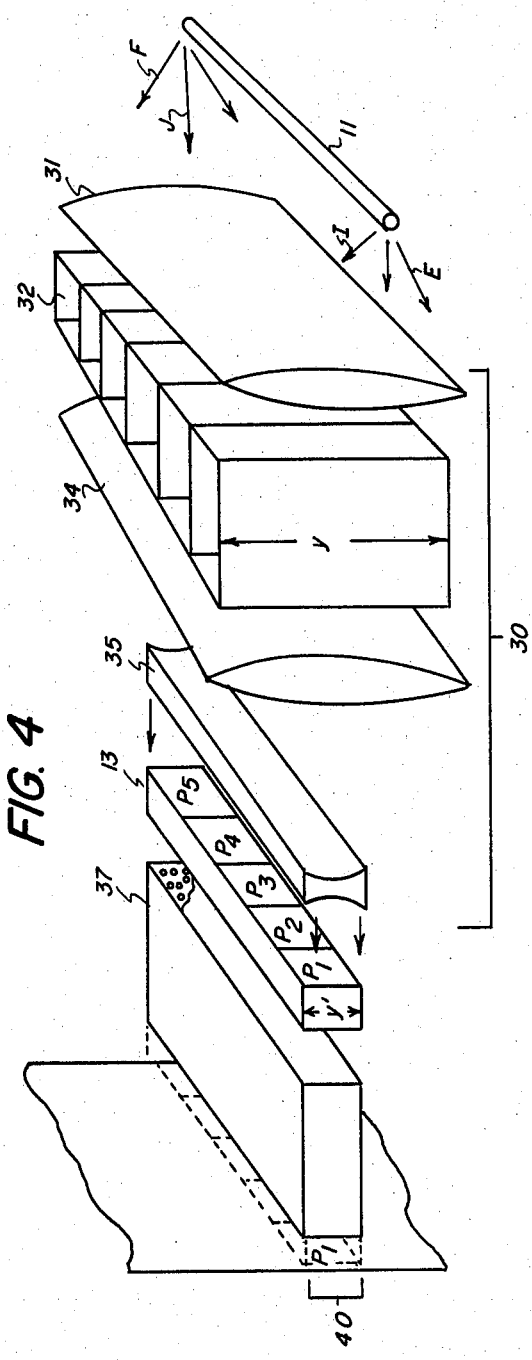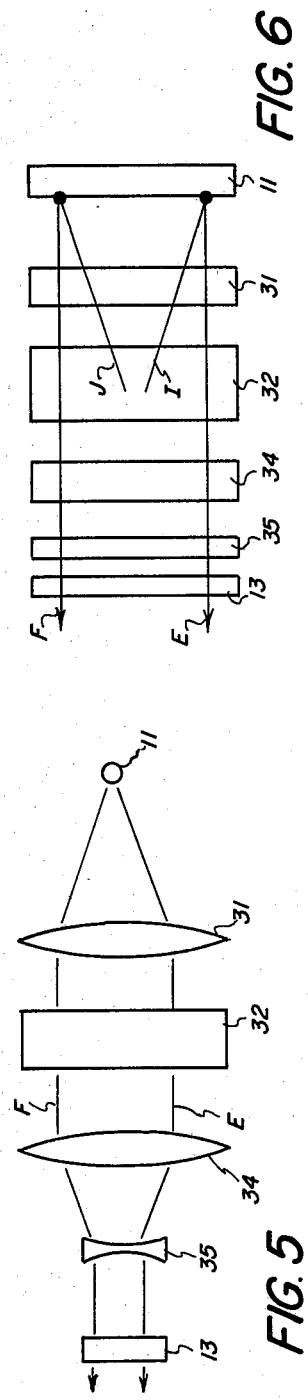

LIGHT VALVE IMAGING APPARATUS HAVING IMPROVED OPTICAL CONFIGURATION

CROSS-REFERENCE TO RELATED APPLICATIONS

Reference is made herein to U.S. Patent application Ser. No. 230,096, entitled "Electronic Imaging Apparatus Having Improved Color Control Device", filed Jan. 29, 1981, in the name of J. M. Mir; U.S. Patent application Ser. No. 230,095, entitled "Light Valve Imaging Apparatus with Optimized Addressing Potential(s) to Reduce Inter-Pixel Nonuniformity", filed Jan. 29, 1981, in the name of J. M. Mir; U.S. Patent application Ser. No. 230,092, entitled "Improved Light Valve Imaging Apparatus and Method for Providing Gray Scale", filed Jan. 29, 1981, in the name of J. M. Mir and U.S. Patent application Ser. No. 230,099, entitled "Light Valve Imaging Apparatus Having Improved Addressing Electrode Structure", filed Jan. 29, 1981, in the names of J. M. Mir and J. R. Varner.

BACKGROUND OF THE INVENTION

1. Field of the Invention

The present invention relates to apparatus for forming an image (on a recording medium or for viewing) from an electrical signal and more particularly to improvements in electronic imaging apparatus of the kind using an array of individually addressable light valves.

2. Brief Description of the Prior Art

U.S. Pat. No. 4,229,095 discloses various embodiments of electronic color-imaging apparatus that utilize arrays of separately-addressable, pixel (picture element) sized, electro-optical means to effect multicolor exposure of panchromatic imaging media. One preferred kind of electro-optical means disclosed in that patent is a light valve comprising a panel of ferro-electric ceramic material, such as lanthanum doped lead zirconate titanate (PLZT) sandwiched between crossed polarizers and activated to operate in a quadratic Kerr cell mode. Thus an array of such light valves comprises a panel of PLZT material with a plurality of interleaved electrodes formed on one major surface in a manner facilitating the selective application of discrete electrical fields across (in a direction perpendicular to the direction of viewing) discrete surface areas of the plate. Upon application of such fields, the PLZT material becomes birefringent and rotates the direction of polarization of incident light by an extent dependent on the field magnitude. This results in the transmission of light through the PLZT panel and polarizers varying as a function of the electric fields. A color image is formed electronically by selectively opening and closing of such light valves in synchronization with the energization of red, green and blue exposing sources and according to the red, green and blue color information for the pixels of that image.

It is highly desirable for such light valve imaging apparatus to have a contrast ratio (i.e. the magnitude of light transmitted when the light valve is "on" to the magnitude of light transmitted when the light valve is "off") which is high. This holds true even for continuous tone imaging, for one preferred technique for achieving a grey scale (i.e. a variation in densities recorded on the photosensitive recording medium) utilizes fixed intensity and variable time to achieve varying exposure levels. I have found that the contrast ratio of such light valve imaging apparatus is significantly affected by the nature of illumination applied to the light valve array, and it is a significant purpose of the present invention to provide improved structure and technique for controlling the light valve illumination to increase the light valve's contrast ratio.

SUMMARY OF THE INVENTION

Thus it is an important advantage of the present invention to provide electronic light valve imaging apparatus and techniques having improved contrast ratios. This and other advantages are obtained, in general, by controlling the illumination from the illuminating source(s) so that the light which is incident on the light valve array is substantially collimated in a direction substantially normal to electro-optic modulator's ingress surface (therefore substantially normal to the electric fields applied transversely across the light valve pixels). One preferred embodiment effects such control in apparatus of the kind having: (1) a light valve array with a plurality of pixel imaging regions, (2) illuminating means for directing illumination toward an imaging zone via the array and (3) addressing means for applying discrete electric fields to pixels of the array in accordance with the optical density pattern of an image to be reproduced, by providing means, located between the illuminating means and the array, for collimating light from the illuminating means in a direction substantially normal to the ingress surface of the array. An especially preferred embodiment of the present invention regulates light from a linear source to direct highly collimated light uniformly to the ingress surface of a linear light valve array. In a related aspect the present invention provides means for collecting a light beam wider than such array and for reducing such beam width to the width of the array.

BRIEF DESCRIPTION OF THE DRAWINGS

The subsequent description of preferred embodiments of the invention refers to the attached drawings in which:

FIG. 1 is a schematic perspective view of one preferred embodiment of the present invention;

FIG. 2 is a cross-sectional view of a light valve array constructed in accordance with one embodiment of the present invention and suitable for use in the FIG. 1 apparatus;

FIG. 3 is a plan view of a portion of the light valve array of FIG. 1 showing exemplary addressing electrode structure for use in the present invention;

FIG. 4 is a schematic perspective view showing further details of one preferred embodiment of the present invention;

FIG. 5 is a diagrammatic side view of a portion of the FIG. 4 apparatus; and

FIG. 6 is a diagrammatic top view of a portion of the FIG. 4 apparatus.

DETAILED DESCRIPTION OF THE PREFERRED EMBODIMENTS

Referring to FIGS. 1 and 2, the electronic color imaging apparatus 10 there illustrated comprises an illumination source 11 for illuminating light valve array 13 with different light colors in a sequential fashion. The illumination source can include separately-energizable red (R), green (G) and blue (B) linear sources as illustrated, comprise a panchromatic source and moving multicolor filter as disclosed in aforementioned U.S.

Pat. No. 4,229,095 or an electro-optic device such as disclosed in copending U.S. Pat. application Ser. No. 230,096, entitled "Electronic Imaging Apparatus Having Improved Color Control Device", filed Jan. 29, 1981, in the name of J. M. Mir.

The light valve array can comprise an electro-optic modulator formed of a material such as disclosed in U.S. Pat. No. 4,229,095 which transforms from an isotropic, non-polar state to a birefringent polar state in response to application of an electric field. One specifically preferred material is 9/65/35 PLZT.

Referring to FIG. 2, such a modulator 20 is sandwiched between crossed ingress and egress polarizing means 12 and 14 of the light valve assembly 13. Referring to FIGS. 2 and 3, the modulator 20 has reference electrodes 21 and signal electrodes 22 formed on the surface thereof in a configuration adapted to provide discretely activatable electric fields transversely across the pixel portions $P_1$–$P_5$ of the electro-optic panel 20. In the embodiment illustrated in FIG. 3, the reference electrodes 21 are commonly coupled to a source of reference potential, e.g., ground, and the signal electrodes of each pixel portion are separately addressable with a potential by addressing means, e.g. serial in-parallel out shift register 25 to activate their respective pixels to an ON or OFF condition. An exemplary addressing ("V" potential applied, "O" no potential applied) is shown in FIG. 2 for the pixel ON, OFF conditions indicated. U.S. Patent application Ser. No. 230,095, entitled "Light Valve Imaging Apparatus with Optimized Addressing Potential(s) to Reduce Inter-Pixel Nonuniformity", filed Jan. 29, 1981, in the name of J. M. Mir discloses preferred operating potential levels for activating pixels of the modulator. U.S. Patent application Ser. No. 230,092, entitled "Improved Light Valve Imaging Apparatus and Method for Providing Gray Scale", filed Jan. 29, 1981, in the name of J. M. Mir discloses one preferred structural approach for addressing such electrodes. Also, there are a variety of electrode configurations which can be utilized to create discrete, separately-activatable fields transversely across the discrete pixel portions of a panel of electro-optic material, some of which are disclosed in copending U.S. Patent application Ser. No. 230,099, entitled "Light Valve Imaging Apparatus Having Improved Addressing Electrode Structure", filed Jan. 29, 1981, in the names of J. M. Mir and J. R. Varner.

In general, the application of an activating field across the inter-electrode gaps "g" of a pixel portion of the electro-optic material causes it to transform to a birefringent state and rotate the direction of polarization of light passing therethrough. Thus the polarized light from ingress polarizer 12 is rotated by activated pixels and is not rotated by non-activated pixels. Egress polarizer 14 is crossed relative to ingress polarizer 12 and therefore light passing activated pixel portions of the modulator 13 passes exit polarizer while light passing non-activated modulator portions does not. Lens means illustrated schematically as L images the light valve array 13 at the apparatus exposure station wherepast a recording medium M is moved by transport means 16.

The movement of recording medium by transport 16, the energization of illumination source 11 by color control 17 and the activation of addressing means 25 by address control 18 are all synchronized, e.g. by synchronization control 19 so that the $P_1$–$P_5$ pixel portions of each line of the recording medium are exposed or not to the different colors of light in accordance with the color image information of the image to be reproduced that is carried to addressing control e.g. in the form of an electrical video signal. It will be appreciated that all multicolor information can be input during a single pass of the recording medium (in which case the illumination source would provide at three separate color pulses per line) or that the medium can make multiple passes (e.g. once for each of red, green and blue exposures).

In accord with the present invention, the FIG. 1 apparatus has light regulating means, denoted generally 30, located between the linear lamps of light source 11 and the light valve array 13. Details of the structure and operation of regulating means 30 will be described subsequently; however, it will be instructive first to consider briefly some of the physical phenomena that pertain to the effects of incident illumination on the contrast ratio of light valve arrays such as shown in FIG. 2. In general, modulators of light valves of this kind are designed with predetermined physical features which cooperate to effect substantially 90° rotation in polarization direction (i.e. relative retardation) of polarized light passing therethrough. These physical features include the electro-optic coefficient, the electric field (determined by the applied voltage and the electrode gap) and length of the optical path over which such field is effective on the passing light (here assumed to be the distance t, the thickness of the modulator panel 20). These parameters are selected with respect to a light having a direction of propogation represented by the ray A which is normal to the ingress surface of the light valve, i.e. the ingress surfaces of polarizer 12 and modulator 13. Thus the distance over which the field induced electro-optic effect of modulator influences light A is "t". Consider, however, light represented by ray B in FIG. 2. It will be appreciated that this light is influenced over a greater distance t cos $\theta$ where $\theta$ represents the extent which ray B is not collimated relative to A, and thus its variance from a non-normal relation to the ingress surface of the light valve array. Because of this difference in path length from the nominal path length, light B will be rotated a different amount from ray A and thus will not as fully pass (if passing at all) the egress polarizer 14.

Another similar effect also exists. Light A which is normal to the ingress surface of polarizer 12 is fully polarized thereby; however light B which is not normal to that surface is incompletely polarized. Thus some of light B can pass analyzer 14 even when passing a non-activated modulator portion. It will be appreciated that both of the above-described effects of non-normal light decrease the contrast ratio attainable by the light valve, for light leaking through "OFF" valves raises the minimum light condition and the "off-angle" light not passing "ON" valves decreases the maximum light condition.

Referring now to FIG. 4, there is shown one preferred embodiment for avoiding "off-angle" light and thus increasing the contrast ratio of apparatus such as shown in FIG. 1. Thus light regulating means 30 disposed between linear light source 11 and linear array 13 comprises a cylindrical collecting lens 31 which has a longitudinal length generally equal to the light valve array and which is constructed to direct light rays passing therethrough into parallel horizontal planes. This can be seen more clearly in FIG. 5 where it will be noted, for example, that lens 31 directs rays E and F of FIG. 4 into parallel horizontal planes. Next in order to further regulate light from source 11 to a normal incidence condition upon the ingress surface of array 13, a linear light baffle array 32 is provided in the light path. Baffle array 32 comprises walls defining a plurality of light passages having an axis normal to the ingress surface of the array. The walls can be constructed of light-absorbing material so that rays that are not substantially normal to the surface of the light valve array will not pass the baffle. This can be seen more clearly in FIG. 6 where normal rays E and F pass baffle 32 while non-normal rays I and J do not. It will be appreciated that the frequency of passages in the baffle and/or passage length parallel to the normal rays can be varied depending upon the degree of regulation desired in the particular light valve imaging application.

Lens elements 34 and 35 provide a further advantageous aspect of the present invention. Thus it will be noted that cylindrical collector lens 31 and baffle array 32 provide a collimated beam of light rays having a width (i.e. the y dimension in FIG. 4) greater than the width y' of the light valve array 13. Cylindrical lens 34 and cooperating negative lens 35 reduce the width of the collimated beam from y to y' while maintaining the collimated rays normal to the ingress surface of the light valve array.

Thus it will be appreciated that the light regulating means 30 provides that the light incident on the light valve polarizer and modulator is highly normal to the ingress surfaces thereof and this improvement will result in higher contrast ratio for apparatus incorporating this improvement.

Referring again to FIG. 4 a further alternative feature of the present invention can be seen. Thus self-focusing lens array 37 is provided between light valve array 13 and exposure station 40. The array 37 can comprise e.g. linear array of gradient-index, fiber optic bundles such as described e.g. in *Applied Optics*, Vol. 19, No. 7, April 1980, pp. 1065–1069.

In one modification of the present invention a linear array of gradient-index, fiber optic bundles such as 37 could be used instead of elements 31 and 32 to restrict the angle of illumination from source 11 so that illuminating light rays are normal to the operative ingress plane of the polarizers and modulator of light valve array 13.

The invention has been described in detail with particular reference to certain preferred embodiments thereof, but it will be understood that variations and modifications can be effected within the spirit and scope of the invention.

What is claimed is:

1. In electronic imaging apparatus having a linear imaging zone and including: (1) a linear light valve array having a plurality of electro-optic pixel portions with light ingress surfaces, (2) illuminating means for directing illumination toward said imaging zone via said light valve array generally uniformly from a linear region parallel to said array and said imaging zone and (3) addressing means for applying discrete electric fields to pixel portions of said light valve array in accordance with an image pattern, the improvement comprising light regulating means, located in alignment between said illuminating means and said light valve array and including a linear light baffle aligned in generally parallel relation with said illuminating means and having walls defining a plurality of light passages with their respective axes substantially normal to the ingress surfaces of said light valve array for passing light from said illuminating means that is directed substantially normal to the ingress surface of said light valve array and blocking light from said illuminating means that is not directed substantially normal to said ingress surface.

2. In electronic imaging apparatus having a strip exposure zone wherepast successive lines of a photosensitive medium can be moved for imaging and including: (1) a linear light valve array having a plurality of pixels each including a modulator portion that is independently activatable by an electric field from an isotropic to a birefringent state and entrance and exit polarizers that are crossed as to polarization direction, (2) illumination means, having a linear dimension substantially coextensive with the length of said light valve array and substantially parallel thereto, for directing light toward said exposure zone via said light valve array and (3) addressing means for applying discrete electric fields to respective modulator portions of said light valve array in accordance with the optical density pattern of an image to be reproduced, the improvement comprising means, located between said illumination means and said light valve array for regulating light from said illumination means so that substantially all light passing from said illumination means to said array is normal to the ingress surfaces of said polarizers and said modulator portions.

3. The invention defined in claim 2 wherein said regulating means comprises cylindrical lens means and a linear light baffle array both aligned in parallel relation with said illumination means.

4. In electronic imaging apparatus having a strip exposure zone wherepast successive lines of a photosensitive medium can be moved for imaging and including: (1) a linear light valve array having a plurality of pixel exposing regions each including a modulator portion that is independently activatable by an electric field from an isotropic to a birefringent state and is sandwiching crossed polarizers, (2) a linear illumination source disposed in a spaced, generally parallel relation to said light valve array and (3) addressing means for applying discrete electric fields to respective modulator portions of said light valve array in accordance with the optical density pattern of an image to be reproduced, the improvement comprising light regulating means, located between said linear illumination source and said linear light valve array, for collimating a portion of the light from said source in a direction substantially normal to the ingress of said light valve array and for restricting the passage to said array of source light that deviates substantially from a direction perpendicular to the longitudinal axis of said source.

5. The invention defined in claim 4 wherein said regulating means comprises cylindrical lens means and a linear light baffle array both having their longitudinal axes generally parallel to said linear source and array.

6. The invention defined in claim 4 wherein said regulating means is wider than said light valve array and said apparatus further includes means for reducing the beam width of the collimated light passing from said regulating means to correspond to the width of said array.

* * * * *